W. CRONK.
CULTIVATOR.
APPLICATION FILED JUNE 17, 1913.
1,177,389.                                  Patented Mar. 28, 1916.
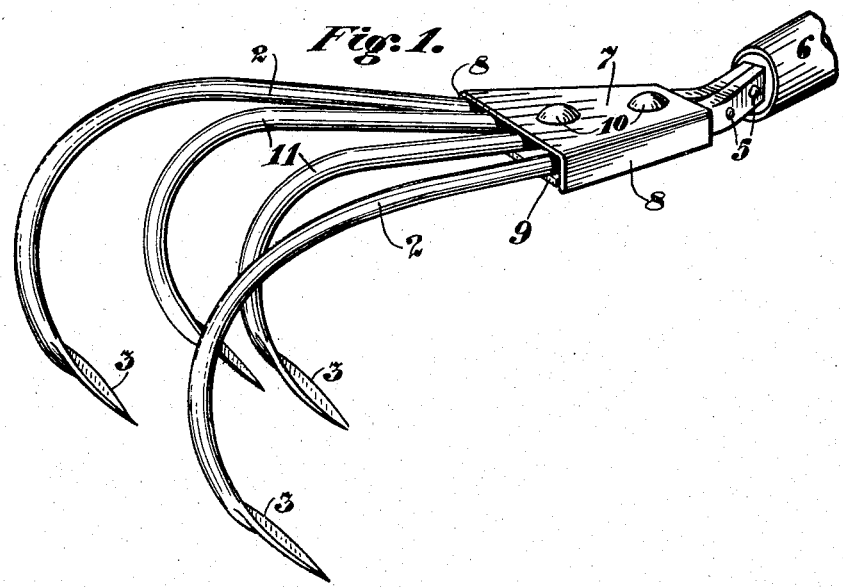
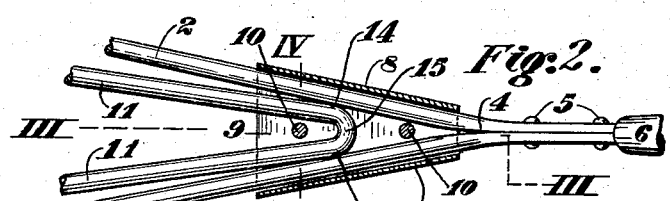
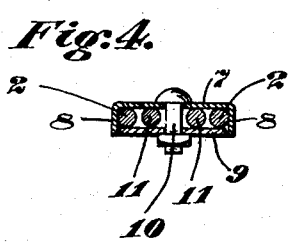
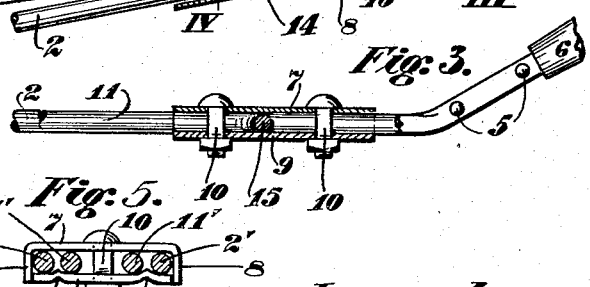
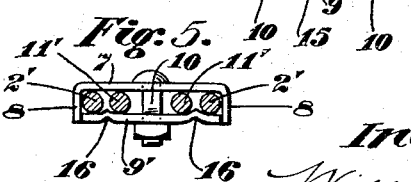
Witnesses:                                  Inventor:

UNITED STATES PATENT OFFICE.

WILLIAM CRONK, OF MONTOUR FALLS, NEW YORK.

CULTIVATOR.

1,177,389. Specification of Letters Patent. Patented Mar. 28, 1916.

Application filed June 17, 1913. Serial No. 774,111.

*To all whom it may concern:*

Be it known that I, WILLIAM CRONK, a citizen of the United States, residing at Montour Falls, in the county of Schuyler and State of New York, have invented certain new and useful Improvements in Cultivators, of which the following is a specification.

My invention consists of an improvement in cultivators of the type usually known as hand cultivators, and has for its objects to provide a simple, compact, strong and economical mechanism for the purpose of rigidly holding the tines of the tool in fixed relation, and in such a manner as to facilitate the attachment or connection with a holding handle or other carrying frame.

Although the improvement, as stated, is designed for a hand implement, the construction well adapts it for use with a gang plow or harrow, in which a plurality of the several groups or units comprising the individual tools are mounted on a suitable supporting or carrying frame.

The improvement consists particularly in the means for connecting the several individual tines and holding them in fixed relation.

In the drawings illustrating preferred forms of the invention,—Figure 1 is a perspective view of the device, showing a four tine implement, the handle being broken away. Fig. 2 is an under plan view of the device, partly broken away, and in section, the securing plate having been removed. Fig. 3 is a longitudinal sectional view, indicated by the line III. III. of Fig. 2. Fig. 4 is a cross sectional view on the line IV. IV. of Fig. 3. Fig. 5 is a similar sectional view showing a modified construction.

In the construction illustrated in Figs. 1 to 4 inclusive, showing a four tine implement, the outer tines 2, 2, having the terminal downwardly turned points 3, are angularly brought together at the point 4, their shanks being flattened and squared, or otherwise suitably forged, to admit of their being fixedly connected by means of rivets 5, whereby to form a substantial single shank portion, for insertion within or connection to the end of the handle 6, or other suitable supporting or carrying frame. As thus arranged, the tines 2, 2, diverge outwardly from the point of juncture 4 angularly, as shown, lying in the same horizontal plane for a portion of their length, and are embraced by the housing plate 7. Said plate, which may be conveniently forged or pressed from sheet or plate metal, is provided with flanged side portions 8, 8, of sufficient depth to embrace the sides of the tines 2, and to extend sufficiently far beyond them to also embrace an intervening closing cover plate or cap 9. Said cover plate, in the construction shown, fits snugly between the inner edges of flanges 8, and is clamped tightly upon the tines 2 by rivets or bolts 10, 10, arranged longitudinally of the axial center of the housing and the thus formed head of the implement. Additional or auxiliary tines 11, 11, having similar downwardly turned pointed terminals 3, are arranged and spaced apart between the outermost tine members 2, 2, and are secured rigidly in connection therewith, by front bolt 10 and the engagement of rear rounded terminal 15 with tines 2, and the plates 7, 9. The shank portions of the intervening tines extend inwardly beyond the front portion of the housing a sufficient distance to insure embracing engagement at top and bottom by the housing plates, as shown. The rear rounded inner end 15 of the double shank portion extends backwardly to a point between the front and rear bolts or rivets 10, its rounded sides extending tightly against the rounded shank portions of tines 2, as at 14, whereby to assist in retaining the middle tines 11 fixedly in position against lateral movement. Said tines are made of one piece bent upon itself, angularly arranged somewhat more acutely than the outer tines whereby to occupy the intervening space, dividing it for proper location of the intervening terminals 3, the intermediate tines in such case being preferably somewhat shorter than the outer ones, as shown in Fig. 1. The clamping housing 7 and its co-acting plate 9 with the side flanges 8 and the tightening bolts or rivets 10 fixedly hold the several parts together against displacement and in rigid relationship for effecting the desired objects and functions of the implement. As thus constructed, when the housing 7 and plate 9 are tightly drawn and secured together, the several parts will be fixedly held in tight relationship, so that the implement is effectively rigid and capable of being manipulated by the rear shank portion and the handle 6 or other holding element to which it is connected.

As indicated in Fig. 5, the cover plate 9 may be swaged inwardly, as indicated at 16, providing inwardly extending points or depressed portions occupying positions between the outermost tines 2 and intermediate tines 11, thereby assisting in fixedly spacing the several tine members and holding them in fixed operative relation.

By my improved construction it will be seen that I secure the several tines in fixed relationship and position by the embracing housing and with the rearwardly extending double shank portion, so that the tool is capable of use as a unit in the manner usual with such implements and with all of the advantages incident in a plural tine cultivator of the general type disclosed.

The construction enables the making of such implements in a variety of forms as to the arrangement and position of the terminal working points; it avoids the necessity of expensive or wasteful cutting of the metal, forging or welding operations, and provides a substantial, rigid, economical and efficient device for the purpose intended.

It will be understood that the angular arrangement of the tines, the specific form of the housing, or the detail construction and arrangement of the several parts may be changed or varied by the skilled mechanic, but that all such changes are to be considered as within the scope of the following claims.

What I claim is:

1. In a cultivator, the combination of angularly disposed outer tines brought together at their rear portions and fixedly secured to each other to provide a rearwardly extending securing shank portion, intervening tines having a rear converging one-piece rear portion formed of a single rod member rounded at its rear end, terminating forwardly of the junction of the outer tines and fixedly engaging their inner portions whereby to hold the intervening tine fixedly in position, a housing box having a supporting bottom for the tines and angularly disposed sides conforming to and embracing the outer tines, a cover plate for the housing box fixedly engaging the tines, and means fixedly securing the housing and cover plate together.

2. In a cultivator, the combination of angularly disposed outer tines brought together at their rear portions and fixedly secured to each other to provide a rearwardly extending securing shank portion, intervening tines having a rear converging one-piece rear portion formed of a single rod member rounded at its rear end, terminating forwardly of the junction of the outer tines and fixedly engaging their inner portions whereby to hold the intervening tine fixedly in position, a housing box having a supporting bottom for the tines and angularly disposed sides conforming to and embracing the outer tines, a cover plate for the housing box fixedly engaging the tines provided with inwardly extending spacing projections, and means fixedly securing the housing and cover plate together.

In testimony whereof I hereunto affix my signature in the presence of two witnesses.

WILLIAM CRONK.

Witnesses:
ELMER L. CRONK,
GEORGE H. CARRIER.

Copies of this patent may be obtained for five cents each, by addressing the "Commissioner of Patents, Washington, D. C."